Aug. 13, 1935.  S. D. BUTTERWORTH  2,010,846
CAR LOADING DEVICE
Filed Aug. 14, 1931
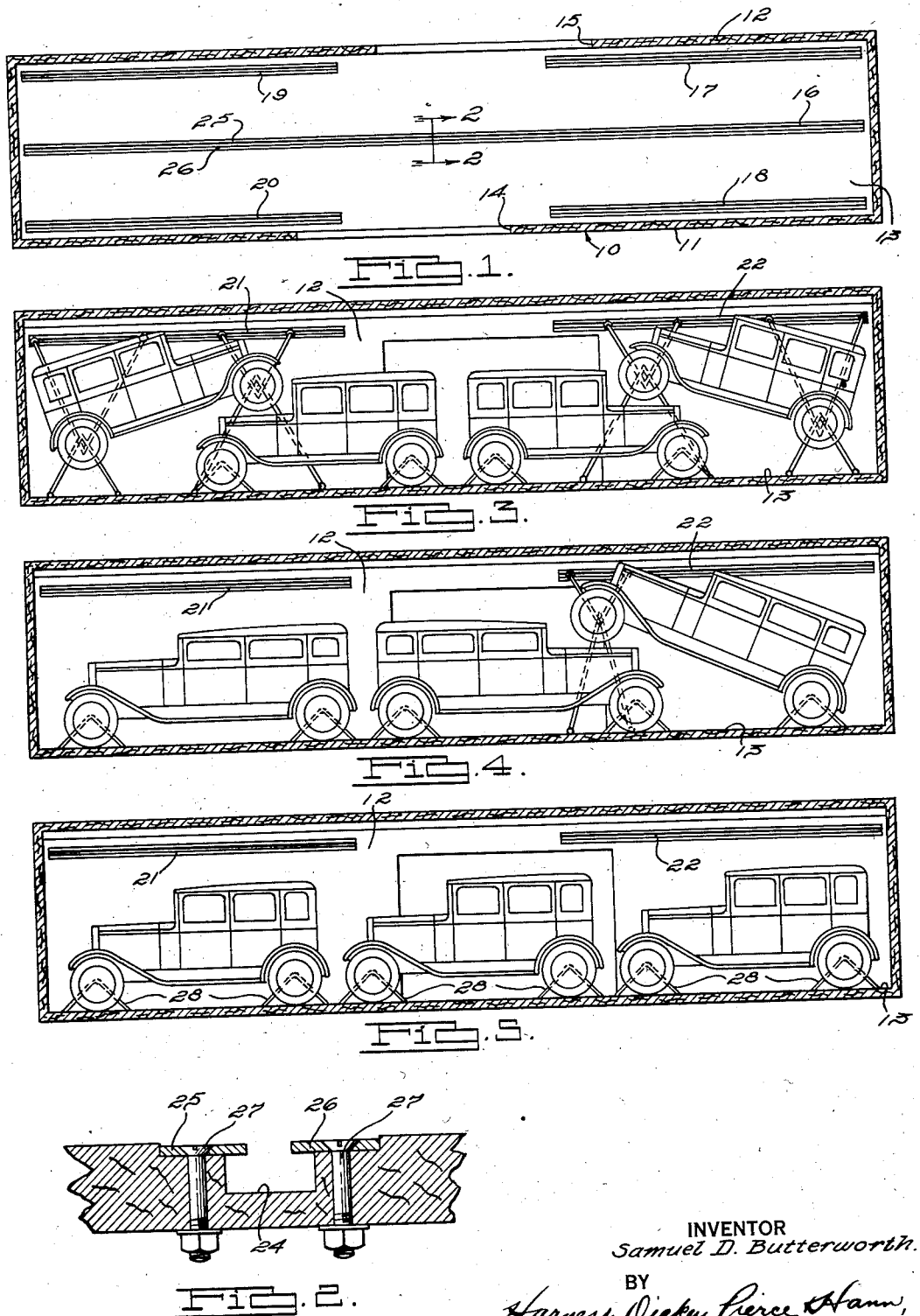
INVENTOR
Samuel D. Butterworth.
BY
Harness, Dickey, Pierce & Hann,
ATTORNEYS.

Patented Aug. 13, 1935

2,010,846

UNITED STATES PATENT OFFICE 2,010,846

CAR LOADING DEVICE

Samuel D. Butterworth, Detroit, Mich., assignor, by mesne assignments, of ninety-nine percent, to The Worth Company, a corporation of Michigan Application August 14, 1931, Serial No. 557,053

2 Claims. (Cl. 105—368)

The invention relates to loading devices and it has particular relation to devices for securing motor vehicles in freight cars for transportation purposes.

The invention is related in certain respects to my application for patent on car loading devices, Serial No. 557,055, filed August 14, 1931, and also it is related in certain respect to my application for patent relating to car loading devices Serial No. 554,616, filed August 3, 1931.

In the first mentioned of these applications for patent, a lazy tong apparatus is employed for supporting a vehicle in the car, in an inclined plane, and particularly with all wheels of the vehicle elevated with respect to the floor of the car. The lazy tongs are of such construction that they embrace the tires of the vehicle and tend to contract about the tires when the vehicle load is imposed thereon. Thrust rods connected to each of the lazy tongs extend downwardly to the floor of the car and have their lower ends adjustably anchored in grooves in the floor, provided at opposite edges of the latter. Other members connected to each of the lazy tongs extend upwardly and have their ends adjustably connected to anchoring devices mounted in grooves or guideways at opposite sides in the upper part of the car. Hence in this arrangement a guideway is provided in the floor of the car at each side thereof, and a guideway is provided at each side of the car in the upper part of the latter.

In the other application for patent, the floor of the freight car is provided with a single groove located centrally thereof which extends longitudinally substantially throughout the length of the car. Anchoring devices are provided in this groove and connecting elements associated with each anchoring device extend respectively to opposite ends of the axle of the vehicle. Ordinarily an anchoring device provided with such connections will be disposed in front of and to the rear of each axle.

The principal objects of the present invention are to provide a novel arrangement and system of guideways in a freight car, for anchoring or supporting motor vehicles therein as a result of which minimum expense will be involved for equipping the freight car in such manner that motor vehicles may be mounted therein in practically any relation desired; to provide vehicle supporting devices which cooperate with this system of guideways for enabling mounting of the vehicles in the most desirable manner, which frequently varies because of variations in dimensions of the vehicle as well as that of the freight car; and to provide novel methods of mounting vehicles in freight cars as a result of which the vehicles can be mounted in a more efficient and satisfactory manner and the maximum number of vehicles stored in a freight car of given dimensions.

For a better understanding of the invention reference may be had to the accompanying drawing forming a part of the specification wherein:

Fig. 1 is a longitudinal cross sectional view of a freight car illustrating a system of guideways provided in the floor thereof;

Fig. 2 is a cross sectional view on a larger scale, taken substantially along line 2—2 of Fig. 1;

Fig. 3 is a vertical, longitudinal cross sectional view of the freight car, illustrating guideways provided in the side walls thereof, as well as a novel manner of arranging and supporting motor vehicles in the car;

Fig. 4 is a cross sectional view similar to that shown by Fig. 3 illustrating another manner of arranging and supporting motor vehicles in freight cars;

Fig. 5 also is a cross sectional view similar to that shown by Fig. 3 illustrating still another manner of arranging and supporting motor vehicles in the car.

Referring to Fig. 1, a freight car is indicated at 10 and comprises the usual side walls 11 and 12 and a floor 13. Doorways 14 and 15 are provided in the side walls 11 and 12 respectively, substantially centrally of the car, although it will be noted that the doorways are disposed in somewhat diagonal relation. The floor is provided with a central, longitudinally extending groove 16, side grooves 17 and 18 at one end of the car, and other side grooves 19 and 20 at the other end of the car. It will be noted that the distance between each pair of side grooves at one side of the car is substantially equal to the width of the door opening.

As shown by Fig. 3, for example, each side wall of the car is provided with grooves 21 and 22 near the upper edge of the wall, and these grooves are substantially equal in length to the side grooves in the floor. Each of the grooves as best shown by Fig. 2, comprises a longitudinally extending recess 24 formed in the floor or wall of the car as the case may be, which is bordered by metal straps 25 and 26 secured by bolts 27 to such floor or wall. Adjacent edge portions of the straps project partially over the recess 24 thereby causing the groove or guideway to be of undercut character.

In the arrangement shown in Fig. 5, three motor vehicles are mounted in the freight car, and are secured in position by means of anchoring devices 28 anchored in the central groove 16 in the floor. The manner of securing the vehicle in position by using this groove has been previously set forth and particularly is described and illustrated in one of my applications for patent previously mentioned. It will be noted that these vehicles are of such length that they can be placed in end to end relation on the floor.

In the arrangement shown by Fig. 4, three vehicles are mounted in the car but these vehicles are longer than those shown by Fig. 5, and hence they cannot be disposed in end to end relation on the floor. For accommodating these vehicles, the central and one of the end vehicles are disposed in end to end relation on the floor with the back part of the vehicles adjacent to each other. The central vehicle then faces the other end of the car and it will be noted that considerable space exists between the radiator thereof and the roof of the car. The third vehicle is disposed in an inclined plane with the rear axle thereof secured by anchoring devices associated with the central groove 16, while the front of the vehicle projects over and above the radiator of of the vehicle next to it, and is supported in this position. For thus supporting the front end of the vehicle, means are provided which are associated with the side groove 22 at the upper edge of the side wall of the car and the side grooves 17 and 18 at opposite edges of the floor. Particularly this means comprises lazy tongs engaging the front tires respectively as particularly pointed out in one of my applications for patent previously mentioned, and each lazy tong is provided with thrust rods extending to the floor and anchored in one of the side grooves, and upper rods extending to and anchored in the groove 22 in the side wall of the car.

In the arrangement shown by Fig. 3, four vehicles are mounted in the freight car, each of which is of slightly smaller wheel base as compared to the vehicles shown in Fig. 5. Two of the vehicles are mounted in the central part of the car by devices associated with the central groove 16 and such vehicles have their backs adjacent substantially midway of the car. Each of the end vehicles faces the vehicle adjacent to it, and is disposed in an inclined plane with the front portion thereof disposed over the radiator of the adjacent vehicle. Owing to the fact that these vehicles have small wheel bases, it is difficult to support the rear tires on the floor, and still maintain the front tires above the radiator of the adjacent vehicle because if the vehicle were so positioned, it would have to be so tilted that the back thereof either would engage an end wall of the car or would be undesirably close to it. Hence it is desirable that the end vehicles be mounted in elevated positions with both front and rear wheels thereof above the floor in order that the vehicle will not be positioned in a plane undesirably inclined. The end vehicles are mounted in this position by lazy tongs engaging the tires, each of which is provided with thrust rods extending to the side grooves in the floor of the car, and other rods extending to the side grooves in the upper part of the side walls of the car. However, the front tires are positioned higher than the rear tires by reason of the fact that the lower rods for each lazy tong associated with the front tires are longer than the rods extending from the lazy tongs for the rear tires, to the floor. The manner of mounting vehicles in this manner is particularly set forth in one of my previously mentioned applications for patent and hence the particular construction of the mounting will not be explained in greater detail.

A freight car of the construction illustrated and described, hence is adaptable for mounting motor vehicles therein in various positions. If it is desired to mount vehicles in the car which are of such wheel base that only three vehicles can be located in the car, they can be arranged in the manner shown by Figs. 4 and 5 depending, of course, upon the length of the vehicle. If the wheel bases of the vehicle are of such length that the vehicles can be disposed in end-to-end relation on the floor, the arrangement shown by Fig. 5 would be used, whereas if the wheel bases are longer, the arrangement shown by Fig. 4 would be used. If the vehicles had still smaller wheel bases than those shown by Fig. 4, the arrangement shown by Fig. 3 would be used, which would permit mounting four vehicles in the car.

Providing a freight car which can easily be adapted for these various arrangements is extremely desirable because it not only facilitates mounting vehicles of different wheel bases in a standard freight car, but reduces the expense that usually is involved in mounting vehicles in a freight car in an efficient manner. The invention makes it possible to mount the largest number of vehicles in a given size of freight car, regardless of dimensions of the vehicle. Moreover, it is apparent that the guideways are so arranged and of such length that minimum expense will be involved in constructing them. Unnecessary guideways are thus clearly avoided.

Although only certain forms of the invention have been illustrated and described in detail, it will be apparent to those skilled in the art that various modifications may be made without departing from the scope of the appended claims.

I claim:

1. In a freight car comprising a floor, side walls and a roof, said floor having a substantially central guideway extending substantially throughout its length, and a pair of short guideways in the lower part of the car at opposite sides of and parallel to the central guideways at each end of the car, the car also having a pair of short guideways at each end located in an upper part of the car at opposite sides thereof respectively, car loading devices cooperating with the lower short guideways and the short guideways in the upper part of the car for holding end automobiles in decking positions and means cooperating with the central guideways for holding automobiles on the floor between the end automobiles.

2. A freight car comprising a floor, side walls and a roof, said floor having a substantially central guideway extending substantially throughout its length and a pair of short guideways at opposite sides of and parallel to the central guideway at each end of the floor, the car also having a pair of short guideways at each end located in an upper part of the car at opposite sides thereof, car loading devices cooperating with the upper guideways and the short guideways in the floor for holding end automobiles in docking position, and car loading devices cooperating with the central guideway for holding automobiles on the floor between the end automobiles.

SAMUEL D. BUTTERWORTH.